US008970540B1

(12) United States Patent
Hebenstreit et al.

(10) Patent No.: US 8,970,540 B1
(45) Date of Patent: Mar. 3, 2015

(54) MEMO PAD

(75) Inventors: Joseph J. Hebenstreit, San Francisco, CA (US); Amish Rajesh Babu, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 537 days.

(21) Appl. No.: 12/890,318

(22) Filed: Sep. 24, 2010

(51) Int. Cl.
*G06F 3/045* (2006.01)

(52) U.S. Cl.
USPC ........ 345/174; 345/173; 345/179; 178/18.01; 178/18.03; 178/19.01; 178/18.056; 178/18.06

(58) Field of Classification Search
CPC .............. G06F 3/0488; G06F 3/03545; G06F 3/04883; G06F 3/04886; G06K 9/222
USPC ............... 345/174, 173, 179, 104; 178/18.01, 178/18.03, 19.01, 18.05, 18.06
See application file for complete search history.

(56) References Cited

U.S. PATENT DOCUMENTS

| | | | | | |
|---|---|---|---|---|---|
| 4,558,313 | A | * | 12/1985 | Garwin et al. | 345/179 |
| 4,777,329 | A | * | 10/1988 | Mallicoat | 178/19.02 |
| 4,972,496 | A | * | 11/1990 | Sklarew | 382/187 |
| 5,444,192 | A | * | 8/1995 | Shetye et al. | 178/18.09 |
| 5,625,833 | A | * | 4/1997 | Levine et al. | 715/203 |
| 5,627,349 | A | * | 5/1997 | Shetye et al. | 178/18.01 |
| 5,629,499 | A | * | 5/1997 | Flickinger et al. | 178/18.01 |
| 5,631,741 | A | * | 5/1997 | Matthews | 358/296 |
| 5,638,093 | A | * | 6/1997 | Takahashi et al. | 345/173 |
| 5,869,789 | A | * | 2/1999 | Reid-Green | 178/18.01 |
| 6,050,490 | A | * | 4/2000 | Leichner et al. | 235/462.49 |
| 6,100,877 | A | * | 8/2000 | Chery et al. | 345/178 |
| 6,124,847 | A | * | 9/2000 | Chery et al. | 345/173 |
| 6,151,611 | A | * | 11/2000 | Siegel | 715/224 |
| 6,230,170 | B1 | * | 5/2001 | Zellweger et al. | 715/205 |
| 6,259,043 | B1 | * | 7/2001 | Clary et al. | 178/18.01 |
| 6,310,615 | B1 | * | 10/2001 | Davis et al. | 345/173 |
| 6,326,957 | B1 | * | 12/2001 | Nathan et al. | 345/179 |
| 6,396,481 | B1 | * | 5/2002 | Challa et al. | 345/169 |
| 6,459,424 | B1 | * | 10/2002 | Resman | 345/173 |
| 6,473,072 | B1 | * | 10/2002 | Comiskey et al. | 345/173 |
| 6,551,357 | B1 | * | 4/2003 | Madduri | 715/235 |
| 6,624,832 | B1 | * | 9/2003 | Thomas | 715/863 |
| 6,867,765 | B2 | * | 3/2005 | LeKuch et al. | 345/173 |

(Continued)

OTHER PUBLICATIONS

Green, et al., "Energy Efficient Flexible Reflex Displays", In the 2008 International Display Research Conference (IDRC '08), University of Central Florida, Nov. 2008, pp. 55-58.

(Continued)

*Primary Examiner* — Lun-Yi Lao
*Assistant Examiner* — Peter D McLoone
(74) *Attorney, Agent, or Firm* — Lee & Hayes, PLLC

(57) ABSTRACT

An electronic device has a marking surface overlaid on a touch sensor. Marks made upon the marking surface create pressure that is transferred through the thickness of the marking surface to the touch sensor. Thus, the signals detected by the touch sensor correspond to the marks made on the marking surface. The marking surface may include a thin material that displays marks such as a pressure-sensitive cholesteric liquid crystal display or a conventional sheet of paper. The touch sensor may comprise a sensor capable of detecting an amount of incident force such as an interpolating force-sensitive resistance touch sensor. The electronic device may also have hardware and/or software to analyze the marks detected by the touch sensor and to communicate with other electronic devices.

36 Claims, 12 Drawing Sheets

(56) References Cited

U.S. PATENT DOCUMENTS

| | | | |
|---|---|---|---|
| 6,912,308 B2* | 6/2005 | Reintjes et al. | 382/181 |
| 7,145,555 B2* | 12/2006 | Taylor et al. | 345/173 |
| 7,146,577 B2* | 12/2006 | Hoffman | 715/865 |
| 7,283,127 B2* | 10/2007 | Taylor et al. | 345/173 |
| 7,310,779 B2* | 12/2007 | Carro | 715/763 |
| 7,619,616 B2* | 11/2009 | Rimas Ribikauskas et al. | 345/173 |
| 7,633,491 B2* | 12/2009 | Okamoto | 345/173 |
| 7,685,538 B2* | 3/2010 | Fleck et al. | 715/863 |
| 7,697,002 B2* | 4/2010 | McCall et al. | 345/467 |
| 7,877,111 B2* | 1/2011 | Silverbrook et al. | 455/557 |
| 8,054,495 B2* | 11/2011 | Goldstein et al. | 358/1.18 |
| 2002/0041271 A1* | 4/2002 | LeKuch et al. | 345/173 |
| 2002/0067854 A1* | 6/2002 | Reintjes et al. | 382/199 |
| 2002/0140714 A1* | 10/2002 | Hoffman | 345/700 |
| 2003/0214490 A1* | 11/2003 | Cool | 345/179 |
| 2004/0049743 A1* | 3/2004 | Bogward | 715/531 |
| 2004/0150631 A1* | 8/2004 | Fleck et al. | 345/179 |
| 2004/0239652 A1* | 12/2004 | Taylor et al. | 345/179 |
| 2004/0262051 A1* | 12/2004 | Carro | 178/18.05 |
| 2005/0083316 A1* | 4/2005 | Brian et al. | 345/179 |
| 2005/0200636 A1* | 9/2005 | Silverbrook et al. | 347/2 |
| 2005/0243369 A1* | 11/2005 | Goldstein et al. | 358/1.18 |
| 2006/0132457 A1* | 6/2006 | Rimas-Ribikauskas et al. | 345/173 |
| 2006/0262098 A1* | 11/2006 | Okamoto | 345/173 |
| 2008/0180410 A1* | 7/2008 | McCall et al. | 345/179 |
| 2009/0237374 A1* | 9/2009 | Li et al. | 345/174 |
| 2010/0265214 A1* | 10/2010 | Green et al. | 345/174 |
| 2010/0315373 A1* | 12/2010 | Steinhauser et al. | 345/174 |

OTHER PUBLICATIONS

"Kent Displays Forms Improv Electronics, Launches Boogie Board (TM) LCD Writing Tablet", PR Newswire, United Business Media, Retrieved on Jul. 7, 2010 at <<http://www.prnewswire.com/news-releases/kent-displays-forms-improv-electronics-launches-boogie-boardtm-lcd-writing-tablet-82290782.html>> pp. 1-2.

Khan, et al., "Applications and Review of Rigid and Flexible Cholesteric Displays", In the Proceedings of Asia Display 2007—International Conference & Exhibition, Shanghai, China, Mar. 2007, pp. 877-881.

Khan, et al., "Recent Progress in Flexible and Drapable Reflective Cholesteric Displays", In SID Symposium Digest of Technical Papers, Jun. 2006, vol. 37, Issue 1, pp. 1728-1731.

Khan, et al., "Recent Progress in Color Flexible Reflective Cholesteric Displays", In the SID Symposium Digest of Technical Papers, May 2007, vol. 38, Issue 1, pp. 54-56.

Marhefka, et al., "Novel Pulsed Drive Scheme for Improved Gray-Level Uniformity of Large-Area Cholesteric Displays", In the SID Symposium Digest of Technical Papers, May 2008, vol. 39, Issue 1, pp. 810-813.

Miller, "Improv Electronics Boogie Board Brings the Chalkboard Into the 21st Century", Jan. 22, 2010, Avaliable at <<http//www.engadge.com/2010/01/22/improv-electronics-boogie-board-brings-the-chalkboard-into-the-2/>> pp. 1-4.

Montbach, et al., "Flexible Ink Jet Printed Conductive Polymer Electrode Cholesteric Display", In the SID Symposium Digest of Technical Papers, Jun. 2006, vol. 37, Issue 1, pp. 1737-1740.

Montbach, et al., "Novel Optically Addressable Photochiral Displays", In the SID Symposium Digest of Technical Papers, May 2008, vol. 39, Issue 1, pp. 919-922.

Schneider, "A Flexible Touch-Sensitive Writing Tablet", In the 2008 SID International Symposium, Los Angeles Convention Center, Los Angeles, CA, May 2008, pp. 1840-1842.

Shiyanovskaya, et al., "Single Substrate Coatable Multicolor Cholesteric Liquid Crystal Displays", In the SID Symposium Digest of Technical Papers, May 2007, vol. 38, Issue 1, pp. 65-68.

Shiyanovskaya, et al., "Substrate-Free Cholesteric Liquid Crystal Displays", In the 26th International Display Research Conference (IDRC 2006), Electronic Paper and Reflective Displays, Kent State University, 2006, pp. 32-34.

"Touchco IFSR Sensor Behind Flexible E-Ink Display", EBooks and EReaders, Retrieved on Jul. 28, 2010 at <<http://ebookereaders.net/touch-ereader/touchco-isfr-sensor-behind-flexible-e-ink-display>>, 2 pages.

Venkataraman, et al., "Thin Flexible Photosensitive Cholesteric Displays", In the 2008 International Display Reserch Conference (IDRC '08), University of Central Florida, Nov. 2008, pp. 101-103.

Doane, et al., "Cholesteric Reflective Displays: Thin and Flexible", In the 26th International Display Research Conference (IDRC 2006), Flexible Displays I, Kent State University, Sep. 18-21, 2006, pp. 9-12.

Khan, et al., "Flexible Cholesteric Displays", Kent Displays Inc., Available at <<http://www.kentdisplays.com/technology/whitepapers.html>> (month not available) 2007, pp. 18-19.

Pop, Sebastian, "I.S.F.R. Multitouch Allows for Unlimited Touch Inputs", Softpedia.com, Dec. 30, 2009, 2 pages.

Schneider, et al., "New Developments in Flexible Cholesteric Liquid Crystal Displays", In the Proceedings of SPIE, Emerging Liquid Crystal Technologies II, Feb. 9, 2007, vol. 6487-6487OJ, 5 pgs.

Schneider, et al., "Single Substrate Cholesteric Liquid Crystal Encapsulation via Polymerization Induced Phase Separation", In the 26th International Display Research Conference (IDRC 2006), Electronic Paper and Reflective Displays, Kent State University, Sep. 18-21, 2006, pp. 35-38.

Schneider, et al., "UV Cured Flexible Cholesteric Liquid Crystal Displays", Kent Displays Inc., Available at <<http://www.kentdisplays.com/technology/whitepapers.html>>, Radtech International UV and EB Curing Technology Expo Conference, May 4-7, 2008, 11 pgs.

\* cited by examiner

MEMO PAD

BACKGROUND

A large and growing population of users is generating and consuming electronic content. As the diversity of users interacting with electronic device and electronic content increases, efforts have been made to increase the usability of electronic devices. Some usability efforts are directed toward making interaction with electronic devices similar to interaction with non-electronic technology. However, creating a satisfactory electronic analog for some non-electronic technology, such as a pen and paper, has proven difficult. Interactions between a stylus and a touch tablet suffer from problems including inadequate pen tracking accuracy, lack of pressure sensitive for nuanced drawing or writing, mismatch in texture (e.g., a hard stylus against a smooth tablet surface does not feel "right"), and lack of real-time writing feedback caused by delays from a processor or display. Many users could benefit from a handwriting interface for electronic devices that does not sacrifice the features of conventional pen and paper.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure is directed towards an electronic device that is capable of functioning as an electronic memo pad. The electronic device is designed to include a marking surface that allows users see their writing in real-time without latency or delay. One type of marking service that may be used is a pressure-sensitive cholesteric liquid crystal display. Pressing on a cholesteric liquid crystal display with, for example, a stylus results in an almost instantaneous transition in the reflectivity liquid crystals at the point of contact. In contrast, other technologies may introduce a delay between the time a user marks on a surface and the time that a display generates an image corresponding to the user's marks.

The electronic device is further designed to convert the marks made by the user into electronic data that may be stored as an image or text file. One aspect of the electronic device is placement of a touch sensor beneath the marking surface. A flexible marking surface that deforms when pressed on by a stylus, or other marking instrument, allows the force generated by the user pressing with the stylus to transfer through the marking surface to the touch sensor underneath. The touch sensor may be implemented as an interpolating force-sensitive resistance (IFSR) touch sensor. IFSR touch sensors are capable of detecting multiple touches and a magnitude of incident of force applied at each point on the touch sensor surface.

The electronic device may be implemented in various forms such as, a stand-alone tablet device, a large drawing surface such as a whiteboard, an input device that is attached as a peripheral to a computer, a device integrated with an electronic book ("eBook") reader device, and the like.

Illustrative Electronic "Memo Pad" Device

Figure 1:
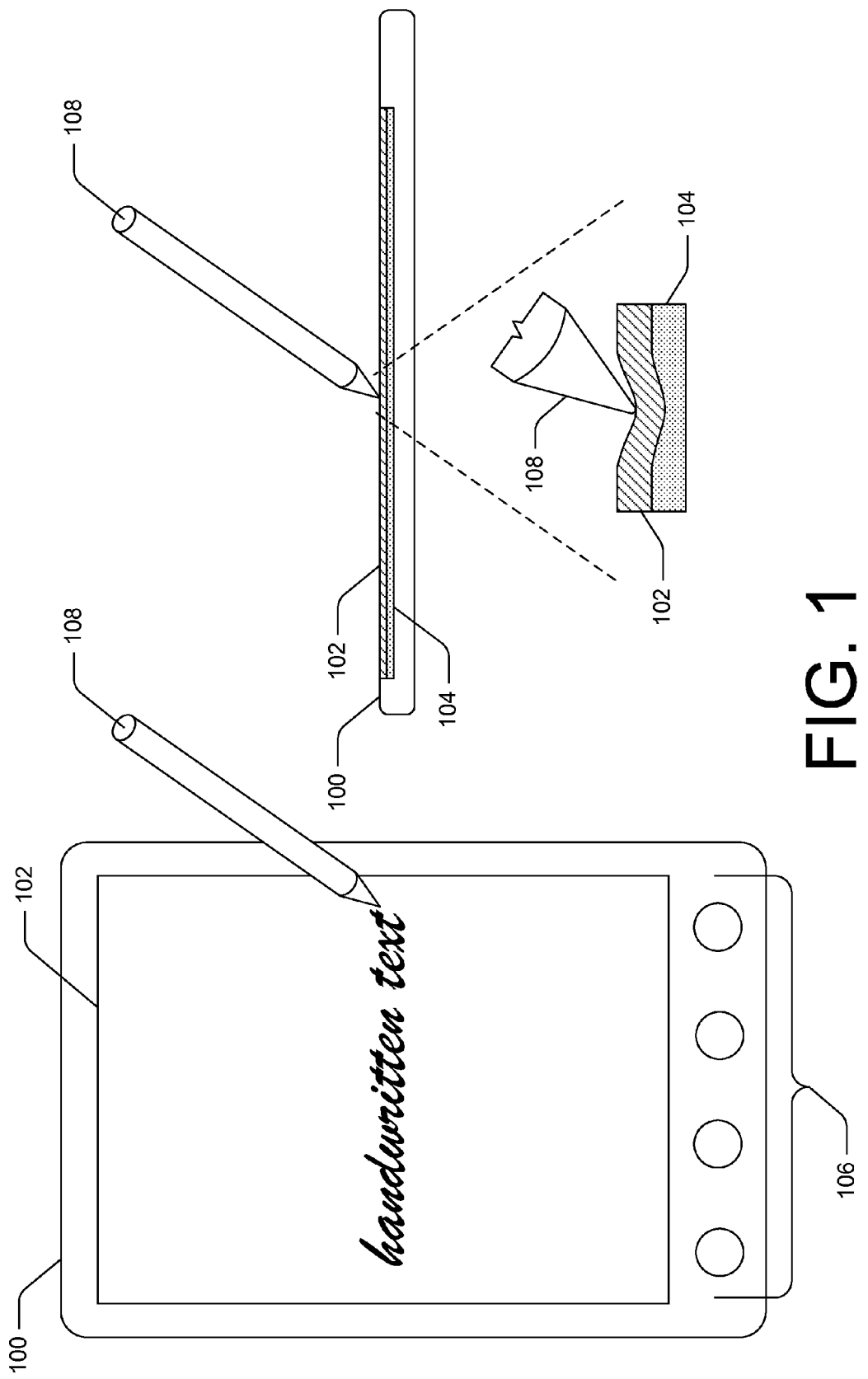
FIG. 1 shows a front and side view of an electronic device that can function as an electronic memo pad.

FIG. 1 illustrates an electronic device 100 having a marking surface 102 for receiving handwritten text or drawings. The electronic device 100 may be configured as a tablet computer, a mobile phone, a dedicated eBook reader device a whiteboard, a computer peripheral, or the like. A touch sensor 104 may be located under the marking surface 102. The electronic device 100 may also include button(s) 106 for receiving user input or commands. In some implementations, the button(s) 106 may be configured as a keyboard.

The marking surface 102 may be capable of displaying marks made by a marking instrument 108 used to draw or write upon the marking surface 102. In some implementations, the marking surface 102 may be a pressure-sensitive cholesteric liquid crystal display. The marking instrument 108 may be a stylus, a pen, a pencil, a fingernail of a user, and so forth. The marking surface 102 may be sufficiently flexible to allow force applied by the marking instrument 108 to transfer through the marking service 102 and be detected by the touch sensor 104. Incident force created by a tip of the marking instrument 108 while making a mark on the marking service 102 may cause the marking surface 102 to bend, and thus, allow the touch sensor 104 to detect a location. If the touch sensor 104 is force-sensitive, a magnitude of force may also be detected. In some implementations, the touch sensor 104 may be an IFSR touch sensor.

When configured as a whiteboard, the touch sensor 104 may be coated with a coating appropriate for use as a whiteboard surface. The whiteboard surface may be made of vinyl, melamine, gloss paint, a hardcoat laminate, or other material capable of functioning as a whiteboard surface. In this implementation, the whiteboard surface is the marking surface 102 and the marking instrument 108 may be a whiteboard or dry-erase marker.

Figure 2:
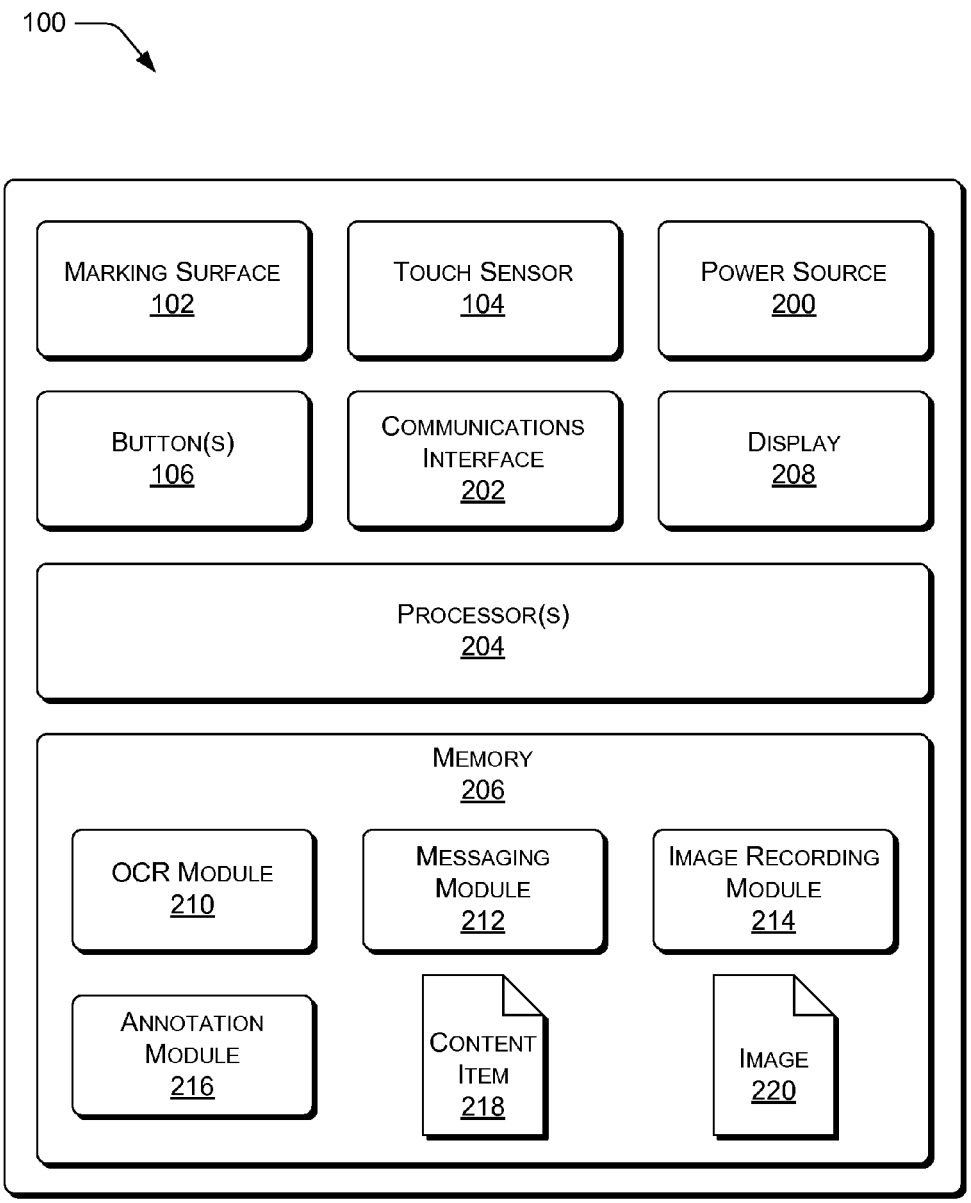
FIG. 2 is a block diagram showing components that may be included in the electronic device of FIG. 1.

FIG. 2 shows illustrative components that may be included in the electronic device 100 of FIG. 1. In a very basic configuration, the electronic device 100 includes the marking surface 102, the touch sensor 104, and a power source 200. The power source 200 may provide power for erasing a pressure-sensitive cholesteric liquid crystal display by resetting the reflectivity properties of the liquid crystals. The power source 200 may also provide power for the touch sensor 104 and other components of the electronic device 100. The power source 200 may be implemented as an on board battery or as a connection to an external power source (e.g., a power cord). For example, when used as an accessory or as a component of another computing device that other computing device may supply power to the electronic "memo pad" device 100. In some implementations, the electronic device 100 may also include the button(s) 106 as an additional input mechanism other than the touch sensor 104.

The electronic device 100 may also include a communications interface 202 for communicating with other devices. The communication interface 202 may support both wired and wireless connection with various technologies, such as cellular networks (3G, 4G), radio, Wi-Fi networks, short range networks (e.g., Bluetooth®), IR, and so forth. Wired communications connections may include a network cable port, a Universal Serial Bus (USB) connector, a FireWire® connector, and the like.

The electronic device 100 may, in some implementations, include functionalities of a computing device. In these implementations, the electronic device 100 may include one or more processor(s) 204, and a memory 206. The memory 206 is an example of computer storage media and may include volatile and nonvolatile memory. Thus, the memory 206 may include, but is not limited to, RAM, ROM, EEPROM, flash memory, or other memory technology, or any other medium which can be used to store media items or applications and data which can be accessed by the electronic device 100.

The electronic device 100 may be equipped with an active electronic display 208 capable of generating images responsive to instructions from the processor(s) 204. In contrast, the marking surface 102 may, in some implementations, be limited to displaying marks made by the user drawing or marking on the marking surface 102 and not display images sent from the processor(s) 204. In those implementations, the marking surface 102 functions as an input device which shows the input, but does not function as an output device.

The memory 206 may be used to store any number of functional components that are executable on the processor(s) 204, as well as data that are rendered by the device 100. For example, the memory 210 may store an optical character recognition (OCR) module 210, a messaging module 212, an image recording module 214, an annotation module 216, and one or more content items 218, such as an image 220 of the marks made upon the marking surface 102.

The OCR module 210 may be configured to analyze handwritten text on the marking surface 102 and convert the handwritten text into machine-encoded text. The OCR module 210 may additionally be configured to recognize a language of the handwritten text and apply appropriate analysis to convert the handwritten text into machine-encoded text. For example, if the handwritten text is determined to be in Spanish, a "~" may be interpreted as a tilde, but if the handwritten text is determined to be in English, the "~" may be interpreted as a stray mark and ignored.

The messaging module 212 may be configured to send a representation of marks detected by the touch sensor 104 to a recipient via the communications interface 202. For example, the user could handwrite a message on the electronic device 100 and send either an image of the handwriting or machine-encoded text of the message as converted by the OCR module 210 as an e-mail message.

The image recording module 214 is configured to take a "snapshot" of the marks displayed on the marking surface 102 (as detected by the touch sensor 104) and save the snapshot either as the image 220 in the memory 206 or in a remote storage device. For example, a user command to take a snapshot or save the notes currently displayed on the "memo pad" may result in the communications interface 202 transferring the image 220 to a network storage location in the "cloud" for storage.

The annotation module 216, may be configured to associate marks (e.g., handwritten notes and drawings) made on the marking surface 102 and detected by the touch sensor 104 with portions of content items 218. In some implementations, a page or other portion of the content item may be displayed on the active display 208 and marks a given portion of the content item 218 is displayed may be re-presented to the user when that given portion of the content item 218 is displayed at a future time.

The electronic device 100 may have additional features or functionality. For example, the electronic device 100 may also include additional data storage devices (removable and/or non-removable), additional input/output devices (e.g., a keyboard, a mouse, speakers, etc.) and the like.

Illustrative Usage Scenarios

Figure 3:
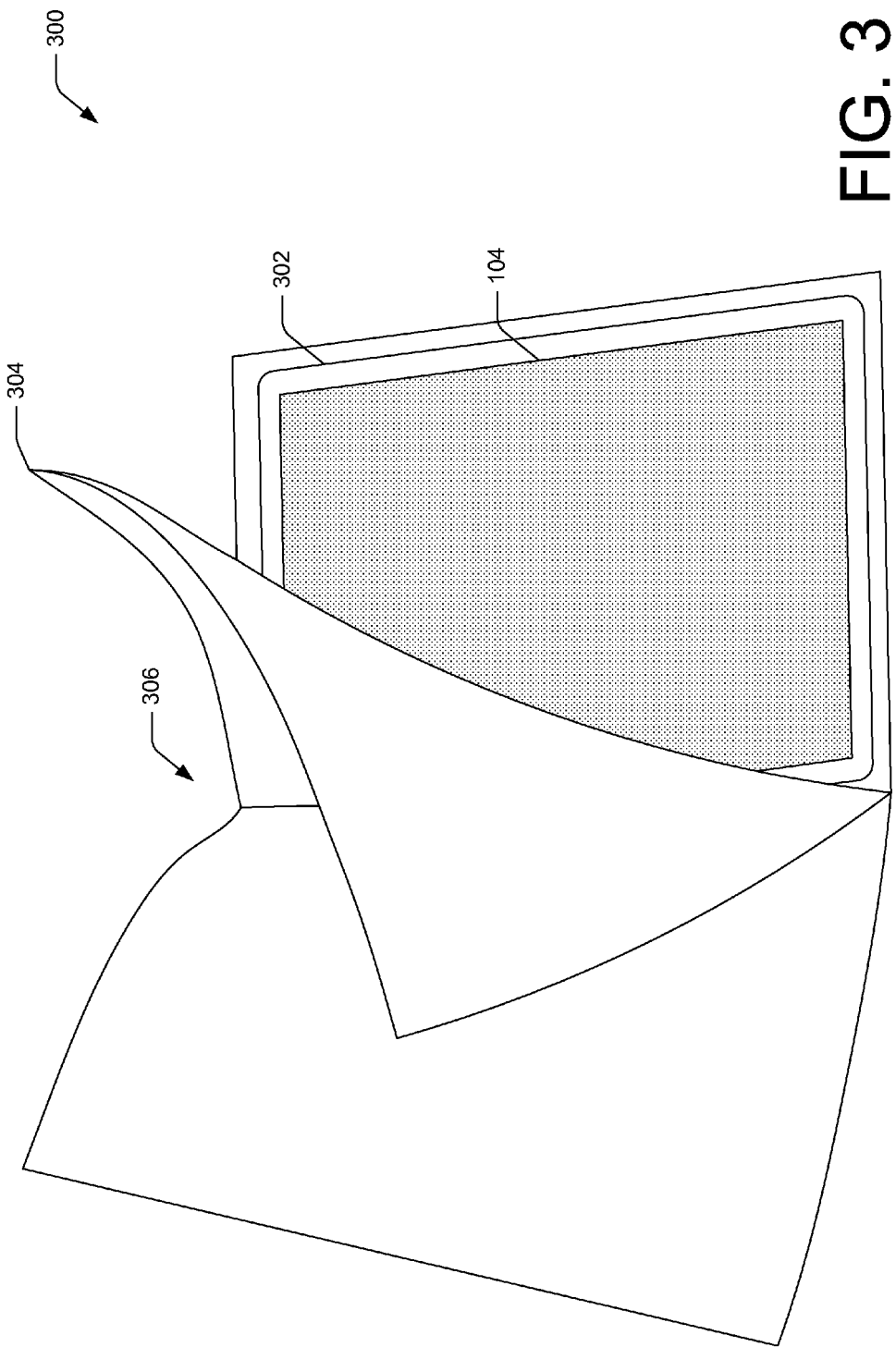
FIG. 3 shows an implementation of the electronic device of FIG. 1 combined with a pad of paper.

FIG. 3 illustrates a perspective view 300 of an electronic device 302 inserted beneath a sheet of paper 304. In this implementation, the electronic device 302 may produce an electronic copy of marks made upon the sheet of paper 304. The electronic device 302 may be similar to the electronic device 100 shown in FIG. 1; however, the marking surface 102 may be omitted and the sheet of paper 304 may instead function as a marking surface. Other elements such as the button(s) 106 may also be omitted.

In this illustration, the electronic device 302 is shown inserted between sheets in a pad of paper 306. In one implementation, the electronic device 302 may be sufficiently thin to fit between sheets of paper bound together in the pad of paper 306. Since the sheet of paper 304 may function as a marking surface, the touch sensor 104 may be exposed on the surface of the electronic device 302 without a marking surface 102.

In other implementations, an additional marking surface 102 may cover the touch sensor 104. For example, the electronic device 302 may include a touch sensor 104 covered with a marking surface 102 that is suitable for writing on with a whiteboard marker. When covered with the sheet of paper 304, pressure from writing on the sheet of paper 304 with a pen or pencil may be transferred through the paper 304, the whiteboard coating (marking surface 102), and ultimately detected by the touch sensor 104. Thus, the functional marking surface may change from a marking surface 102 integrated into the electronic device 302 (e.g., the whiteboard surface) to a sheet of paper 304 overlaid on top of the electronic device 302.

Figure 4:
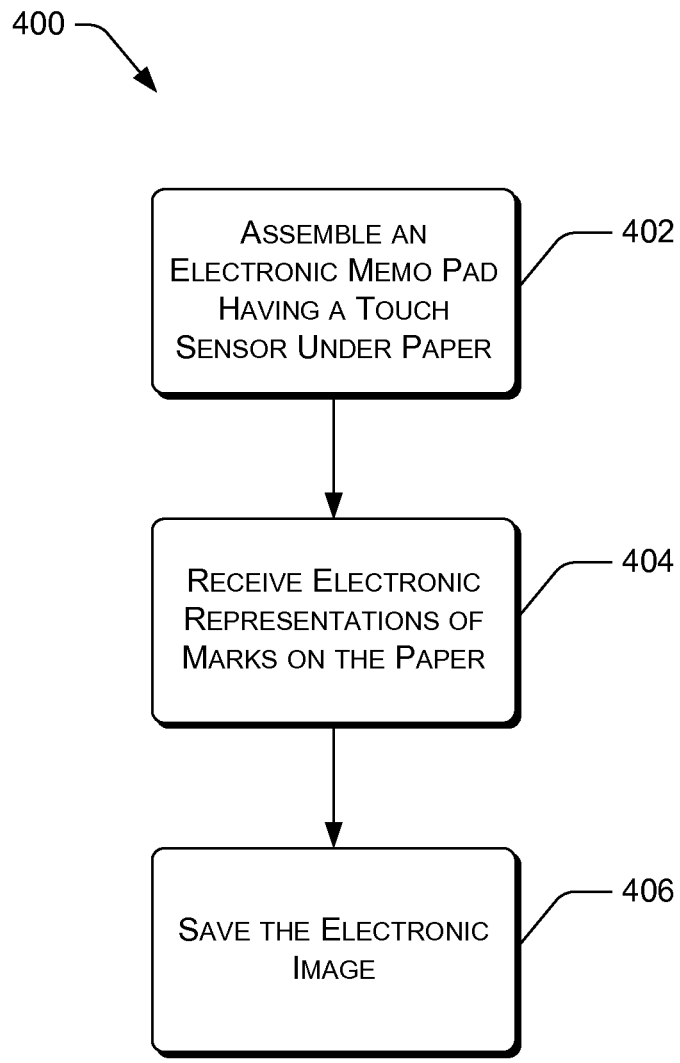
FIG. 4 is a flow diagram of a process for using the electronic device of FIG. 3 together with the pad of paper.

FIG. 4 illustrates an example process 400 that may be implemented by the devices shown above in FIG. 3. Process 400 may also be implemented by devices other than those shown and described above.

At 402, an electronic memo pad having at least one touch sensor positioned under one or more sheets of paper is assembled. The touch sensor may be implemented as a tablet device inserted between pages of a notepad (e.g., the device 302 of FIG. 3). The touch sensor may also be implemented as a table (e.g., drafting table) or larger type of surface on which paper is placed. In some implementations, the touch sensor may include a clip, clasp, elastic band, or other feature for holding the one or more sheets of paper to the surface of the touch sensor.

At 404, electronic representations of marks made on the paper are received. The touch of the marking instrument on the one or more sheets of paper may transfer through the one or more sheets of paper to the touch sensor. The touch sensor may then generate an electronic image of the marks based on the location of the touch that made the marks. So long as the force of the touch made on the paper can be detected by the touch sensor, multiple sheets of paper may be overlaid on the touch sensor. The touch sensor may function like electronic carbon paper that creates a copy of anything written or drawn on the sheet of paper on top of the carbon paper. When the touch sensor is implemented as a force-sensitive touch sensor, the amount of force applied in making the marks as well as the location of the marks may both be recorded by the touch sensor.

At 406, the electronic image is saved. The electronic image may be saved to a local storage of the electronic memo pad such as the memory 206 shown in FIG. 2. Additionally or alternatively, electronic image may also be saved to a remote storage device such as another computing device communicatively coupled to the electronic memo pad or saved to a network or "cloud" based storage device.

It is possible for a user to write a note or draw a picture on one sheet of paper placed over the touch sensor, replace the marked sheet of paper with a new sheet and then continue writing or drawing. Without a mechanism for the identifying the changing of the sheets of paper, the electronic image generated by the touch sensor may include two separate writings or drawings overlaid on top of each other. To prevent the creation of such a confounded image, the electronic device containing the touch sensor may include a mechanism to save an image detected by the touch sensor and to create a new file or allocate a new region of memory to record additional markings. This functionality may be implemented, for example, by the image recording module 214 shown in FIG. 2. Additionally or alternatively, multiple versions on an image at different time points (e.g., as the user draws on the same sheet of paper) may be separately saved in response to a save command.

The command to save the electronic image may be initiated in any number of ways. In one approach, pressing a button such as one of the button(s) 106 shown in FIG. 1 may direct the memo pad to save the image. Turning a page of one or more sheets of paper, such as the sheet of paper 304 in the pad of paper 306, may also initiate the "save image" command. In some implementations, a spine or other device binding the sheets of paper together may register that a page has been turned and provide that information to the image recording module 214. In other implementations, a mechanical sensor such as a clip that holds the sheets of paper to the touch sensor (e.g., the clip on a clip board where the clipboard may be the touch sensor) may initiate a command to save the electronic image when the clip is opened.

Figure 5:
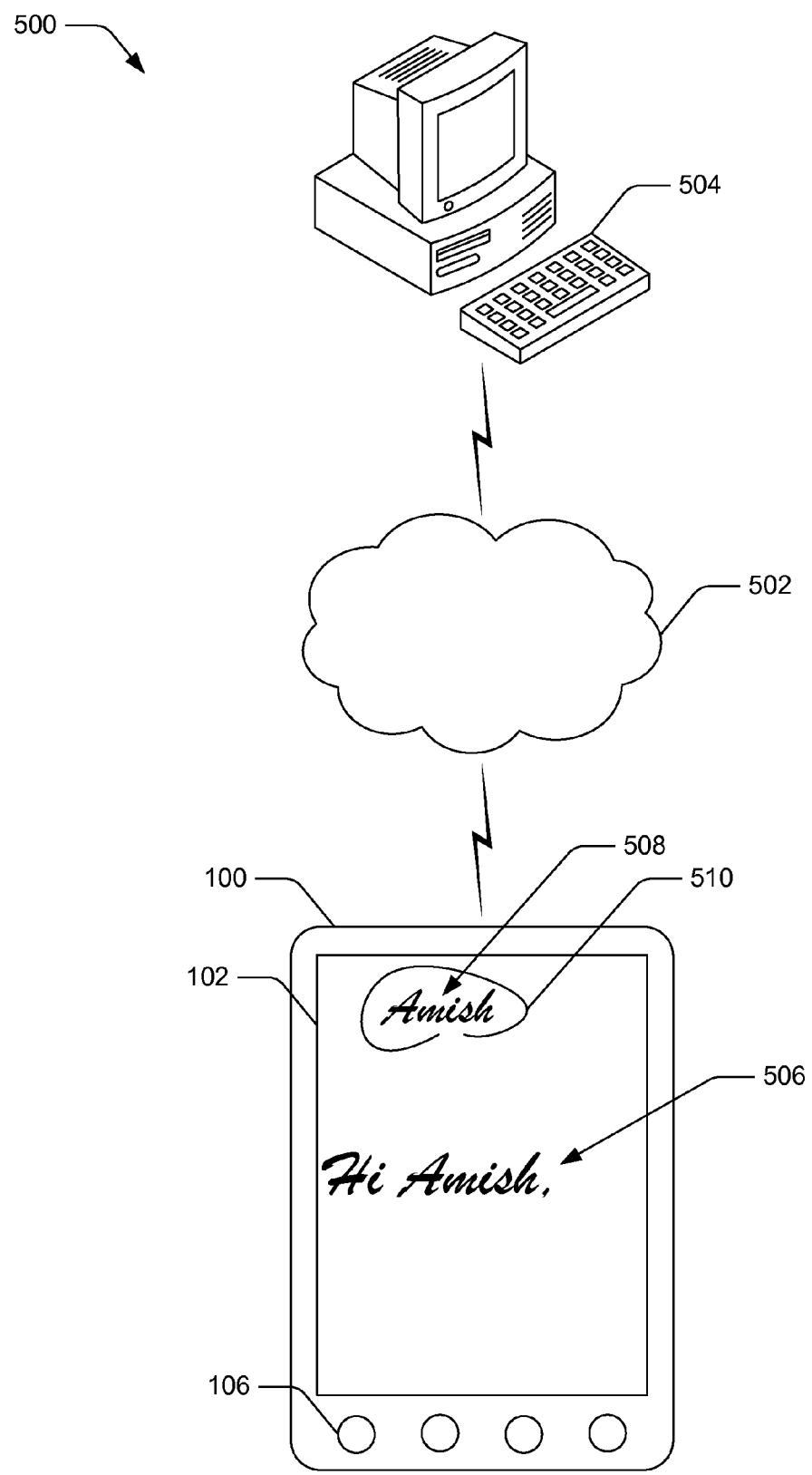
FIG. 5 shows an architecture for the electronic device of FIG. 1 to communicate with another computing device.

FIG. 5 shows an illustrative architecture 500 of the electronic device 100 communicating over a network 502 with a computing device 504. The network 502 may be any type of communications network such as the Internet, a cable network, a telephone network, a local area network, a wide area network, a mesh network, an ad hoc network, etc. The computing device 504 may be any type of computing device such as a desktop computer, a notebook computer, a netbook, a set-top box, a smart phone, a personal digital assistant, an eBook reader device, and the like.

A user may handwrite a message or other communication 506 on the marking surface 102 of the electronic device 100. For example, the message 506 may be sent as an e-mail message through an e-mail server in the network 502 to the computing device 504 of another user (e.g., the user's friend Amish). The OCR module 210 may convert a handwritten message to machine-encoded text and the messaging module 212 may send the machine-coded text as the content of the e-mail message. Alternatively, the messaging module 212 may send the handwritten message as an image file attached to or included in the body of the e-mail message. The messaging module 212 may also send a combination of machine-encoded text and images. For example, portions of the handwritten message 506 that the OCR module 210 recognizes as text may be converted and sent as machine-coded text while other parts (e.g., drawings) of the handwritten message 506 are sent as image files. Pressing on one of the button(s) 106 of the electronic device 100 may initiate sending the e-mail message.

In some implementations, the destination for the message may also be indicated by handwriting on the marking surface 102. For example, the user may handwrite an e-mail address of the intended recipient, the OCR module 210 may convert that handwriting into machine-encoded text, and the messaging module 212 may recognize the text, for example by recognizing that xxx@yyyy.zzz is the format of an e-mail address, as the intended recipient address. In some implementations, other types of handwritten marks may be interpreted by the messaging module 212 as designating an electronic address. For example, the name 508 of the intended recipient (e.g., Amish) with a circle 510 drawn around it may designate an intended recipient and the electronic address for the recipient (e.g., Amish's e-mail address) may be retrieved from an address book.

Although the examples above discuss sending e-mail, the architecture 500 else be used for other types of messaging and data transfer. For example, the user may write blog entries on the marking surface 102 and the computing device 504 may be a web server that incorporates the entries into the user's blog. The handwritten message 506 may also be a text message rather than an e-mail message. Additionally, if one recipient (e.g., Amish) has different electronic addresses associated with his identity, then the type of the mark 510 may indicate which address to send the message 506. For example, the circular mark 510 could indicate e-mail while a square mark drawn around the recipient's name 508 could indicate that the message is to be sent as a text message.

Figure 6:
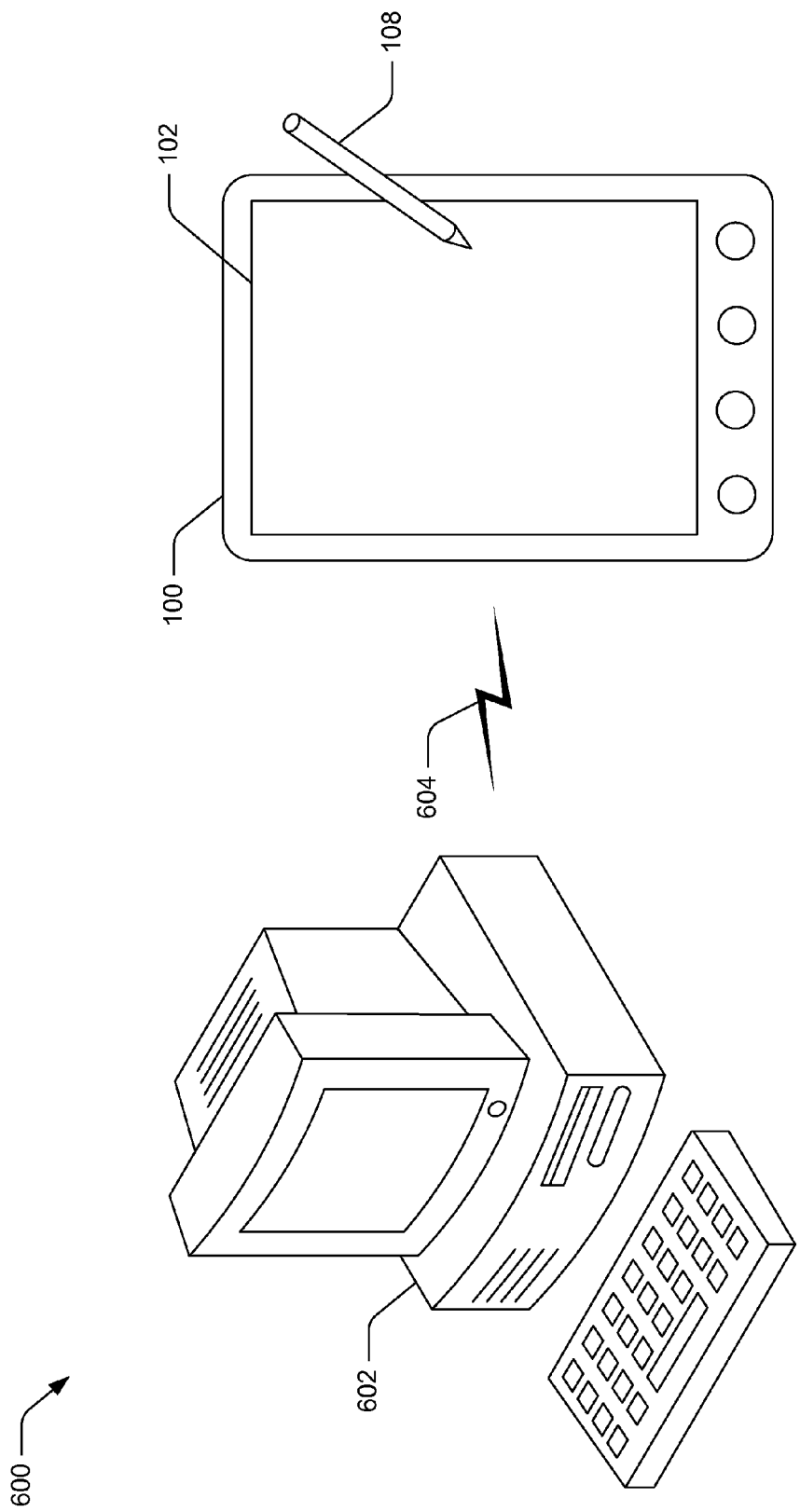
FIG. 6 shows an implementation of the electronic device of FIG. 1 as a peripheral for a computing device.

FIG. 6 shows an architecture 600 of the electronic device 100 directly communicating with a computing device 602. In some implementations, the electronic device 100 may switch from being a standalone tablet device to a peripheral for the computing device 602 when connected to the computing device 602. The electronic device 100 may be communicatively coupled to the computing device 602 along a communication channel 604. The communication channel 604 may be wired or wireless. In a wired implementation, the communication channel 604 may also supply power to the electronic device 100. In this implementation, the power source 200 may also switch from battery to power received from the computing device 602 within the electronic device 100 is connected to the computing device 602. When commutatively coupled to the computing device 602, the electronic device 100 may function, for example, as a drawing tablet on which the user may mark with a stylus 108. In this implementation, marks made on the marking surface 102 may be shown both on the marking surface 102 and on a display of the computing device 602.

Figure 7:
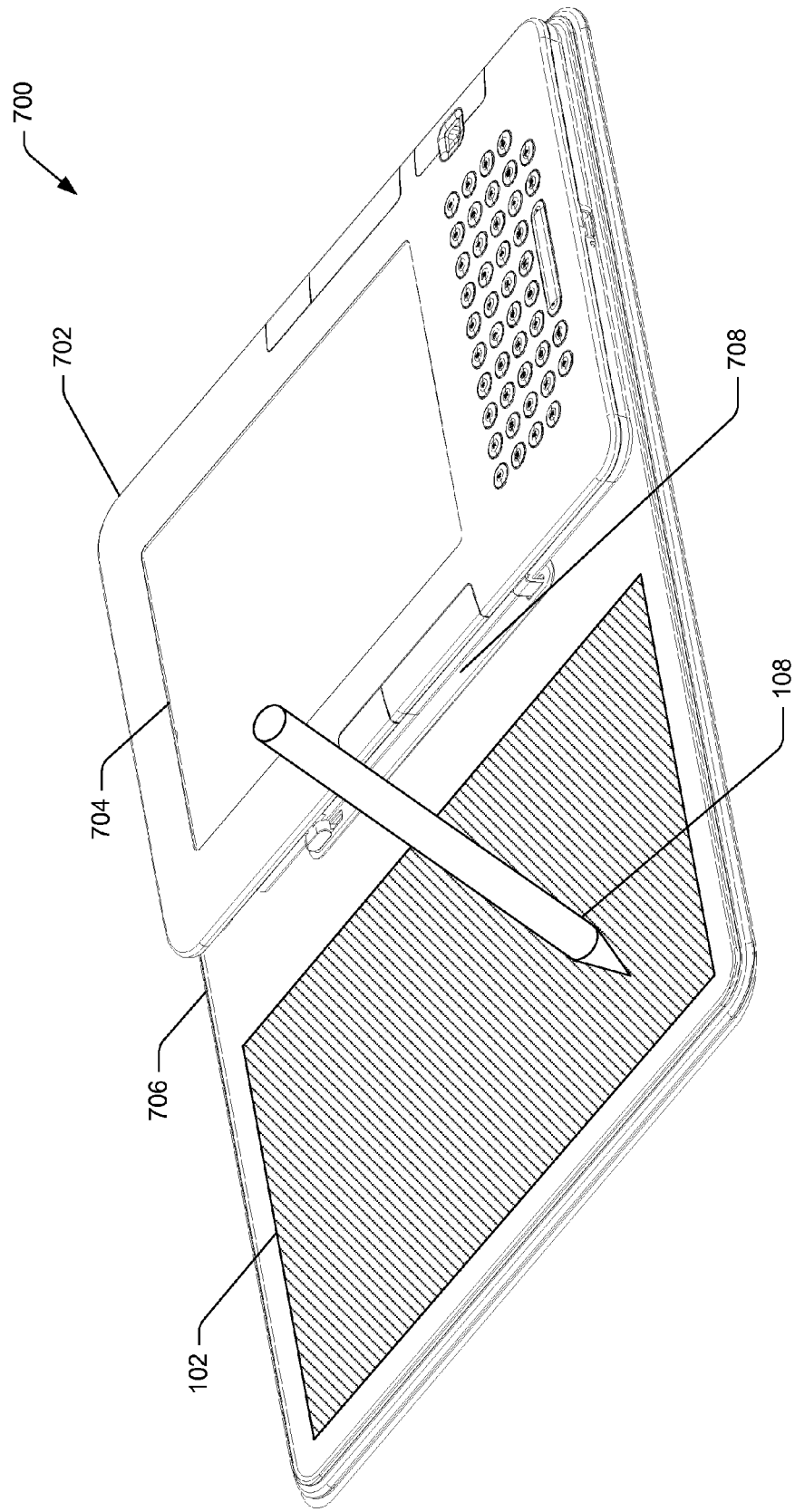
FIG. 7 shows an implementation of the electronic device of FIG. 1 as part of an eBook reader device.

FIG. 7 shows a perspective view 700 of a dedicated eBook reader device 702 with an integrated marking surface 102 and touch sensor 104 (not shown, but beneath the marking surface 102). Some of the components shown in FIG. 2 may be present in the eBook reader device 702. In a basic configuration, the eBook reader device 702 includes an active display 704, one or more processor(s) 204, and a memory 206. In some implementations, the active display 704 and the display 208 shown in FIG. 2 are two different displays. In other implementations, the dedicated eBook reader device 702 employs a common display so that the user reads and marks on the same display. The active display 704 may be implemented as an electrophoretic display (EPD), also known as "ePaper." In some implementations, the EPD is bi-stable, meaning that it is capable of holding text or other rendered images even when very little or no power is supplied to the display. The active display 704 may be reflective, such that images are rendered using an ambient light source external to the display. Such displays include electrophoretic displays (EPDs), bi-stable liquid crystal displays (LCDs), digital micromirror devices (DMDs), cholesteric, pigmented electrophoretic, interferometric, and others. Emissive displays which generate their own light for display may also be used. For example, the active display 704 may be implemented as a backlit LCD, organic light emitting diode (OLED) display, and so forth.

The active display 704 may display content items, such as electronic books or "eBooks." The term "eBook," as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, webpages etc. Accordingly, the terms book and/or eBook may include any visual content that is in electronic or digital form.

As shown here, the eBook reader device 702 is placed inside a cover 706. The cover 706 includes a front cover panel, a spine, and a back cover panel. The inside of the front cover panel may contain a "memo pad" (i.e., the marking surface 102 and the touch sensor 104). Thus, the cover 706 may be one implementation of the electronic device 100 shown in FIG. 1. The cover 706 may be physically affixed to the eBook reader device 702 by a connection mechanism 708. In one implementation, the connection mechanism 708 is implemented as clips on the spine of the cover 706. Detachment of the cover 706 from the eBook reader device 702 may allow the marking surface 102 and touch pad 104 included in the cover to function as a standalone "memo pad" device when separated from the eBook reader device 702.

The connection mechanism 708 may further facilitate an electrical connection as well as a physical connection. For example, the connection mechanism 708 may create a physical-electrical connection that carries electrical current for powering the marking surface 102 and the touch sensor 104 as well as physically connecting the cover 706 to the eBook reader device 702. The connection mechanism 708 may also transfer data between the "memo pad" in the cover 706 and the eBook reader device 702. In some implementations the "memo pad" may be integrated into the eBook reader device 102 so that the "memo pad" is not separable from the remainder of the eBook reader device.

The user may take notes on the marking surface 102 independent of any content item displayed on the active display 704. For example, the user may pause while reading an eBook and use a stylus 108 to write a grocery list on the marking surface 102. The marking surface 102, and touch sensor 104, may also be used to comment on or annotate content (e.g., an eBook) shown on the active display 208 of the eBook reader device 702. Annotation is discussed in greater detail in the section below describing FIG. 8.

Marks made on the marking surface 102, such as when the marking surface is implemented as a pressure-sensitive cholesteric liquid crystal display, may be cleared by application of electrical energy. The user may clear the marking surface 102 by pressing a button on the eBook reader device 702 that transmits a clear-display command through the connection mechanism 708 to the marking service 102. The connection mechanism 708 may also transmit the electrical energy necessary to clear the marking surface 102.

Figure 8:
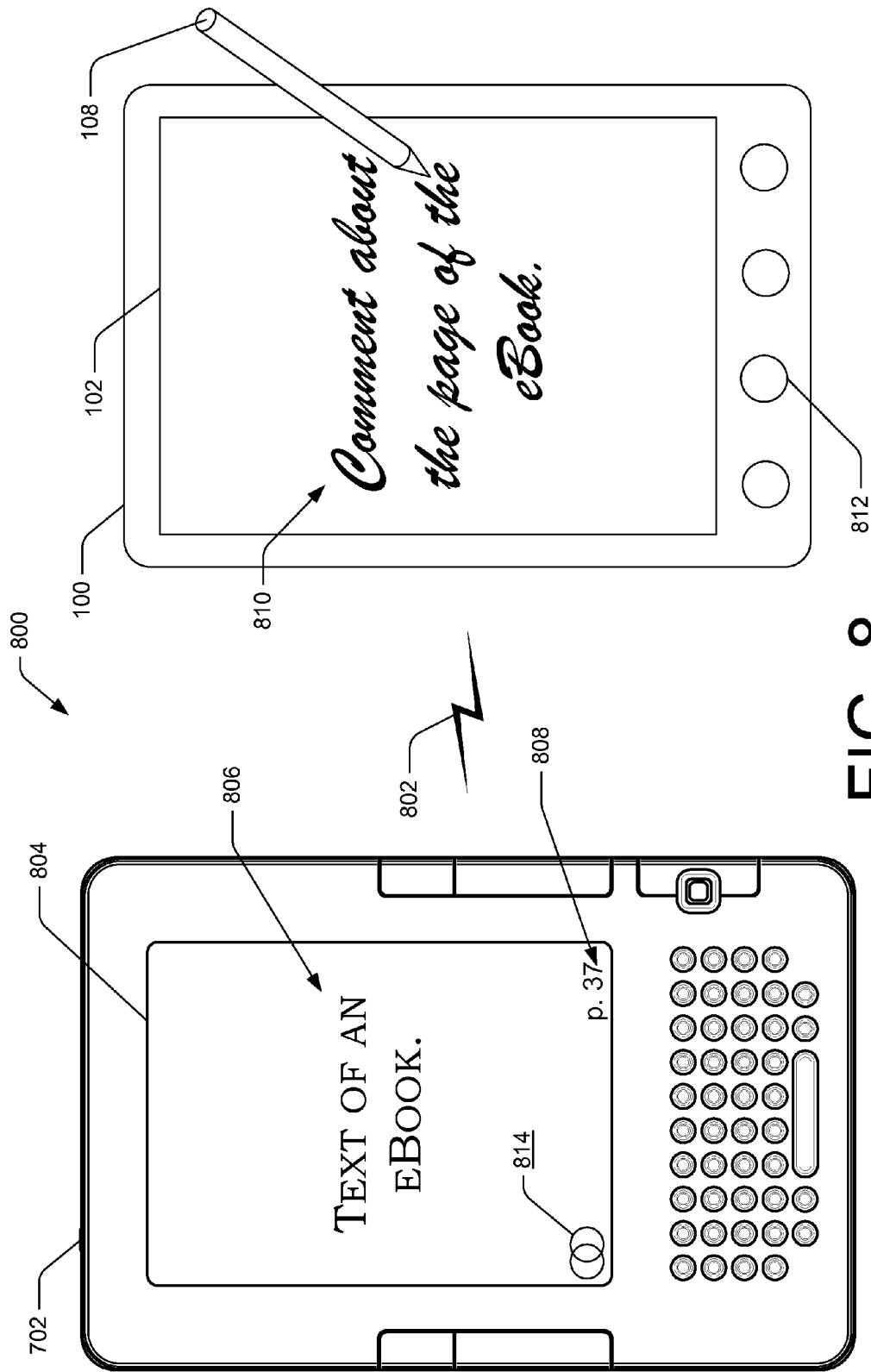
FIG. 8 shows the electronic device of FIG. 1 communicating with an eBook reader device to annotate a page of an eBook.

FIG. 8 shows an architecture 800 including the eBook reader device 702 communicatively coupled to the electronic device 100. The eBook reader device 702 and the electronic device 100 as shown in the architecture 800 may be connected by a communication channel 802. The communication channel 802 may be, for example, the connection mechanism 708 which provides for data transfer between the eBook reader device 702 and the cover 706. Thus, the eBook reader device 702 and the electric device 100 may be part of a same device and the communication channel 802 may represent an internal connection such as internal wiring. In other implementations, the communication channel 802 may connect two separate devices either via a wired connection or wirelessly.

The active display 804 of the eBook reader device 702 may display a page of an eBook 806 or a portion of another content item. The page may be identified by a page number 808. Other implementations may involve displaying a webpage and identifying the webpage by a uniform resource locator (URL) or other identifier.

While viewing the page of the eBook 806, the user may wish to make comments regarding the displayed portion of the eBook 806. The user may comment about the page of the eBook 806 by handwriting, drawing figures, or otherwise making comments 810 with a stylus 108 or other marking instrument on the marking surface 102 of the electronic device 100.

The comments 810 made on the electronic device 100 may be associated with the portion of the eBook 806 contemporaneously displayed on the active display 804 of the eBook reader device 702 by the annotation module 216 shown in FIG. 2. In the architecture 800, the annotation module 216 may be implemented in the electronic device 100, the eBook reader device 702, or both. The user may indicate that the comments 810 shown on the marking surface 102 and detected by the touch sensor 104 (not shown, but beneath the marking surface 102) are to be associated with the currently displayed portion of the content item 806 (e.g., the eBook) by pressing a button 812 on the electronic device 100. In some implementations, pressing the button 812 may also clear the marks from the marking surface 102 and from any temporary memory storing the marks as detected by the touch sensor 104. Other types of user commands such as, for example, pressing a button on the eBook reader device 702 may also be used to link the comments 810 to the portion of the content item 806.

In some instances, the comments 810 may be stored in the memory of the electronic device 100, a memory of the eBook reader device 702, or in another memory store such as in a networked memory device available in the "cloud." If the user comments 810 are stored in the cloud in association with the text of the eBook 806, then every time the user (e.g., as identified by a user name and/or login credentials) accesses the eBook from a networked device, those comments 810 may be accessible to the user. When reviewing an eBook or other content item that has been previously commented on or annotated by the user or another user, the previous comments 810 may be displayed on the active display 208 along with the corresponding portion of the eBook 806. Alternatively, a link 814 may be displayed on the active display 208 that, when activated, causes the previous comments 810 to be displayed either together with or instead of the text of the eBook 806.

Although discussed above using the example of the eBook reader device 702, annotations and the functions of the annotation module 212 may be implemented with other devices and in other architectures. For example, the architecture 600 shown in FIG. 6 may also support annotating/commenting on portions of content items displayed on the monitor of the computing device 602, on a screen of a smart phone, and the like.

Figure 9:
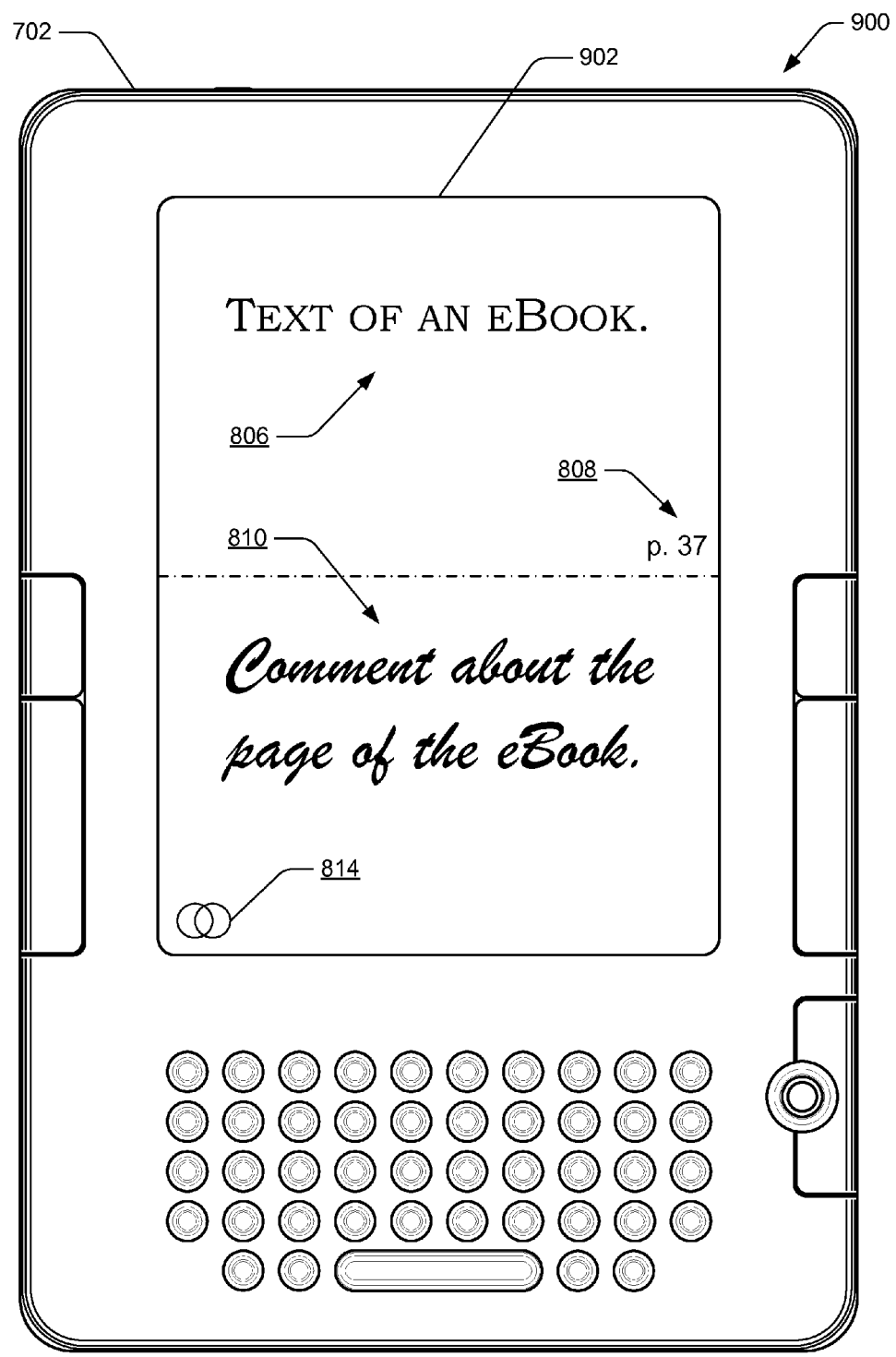
FIG. 9 shows a user interface of the eBook reader device of FIG. 8.

FIG. 9 shows a user interface 900 of the eBook reader device 702 shown in FIG. 8. The user interface 900 may be generated in response to the user activating the link 814 so that the previously received comments 810 are displayed together with or instead of the text of the eBook 806. Here, the active display 902 of the eBook reader device 702 shows the comments 810 on a split screen together with the associated text of the eBook 806. However, other user interfaces are also possible such as an interface that shows the comments 810 in a sidebar, pop-up window, etc.

Figure 10:
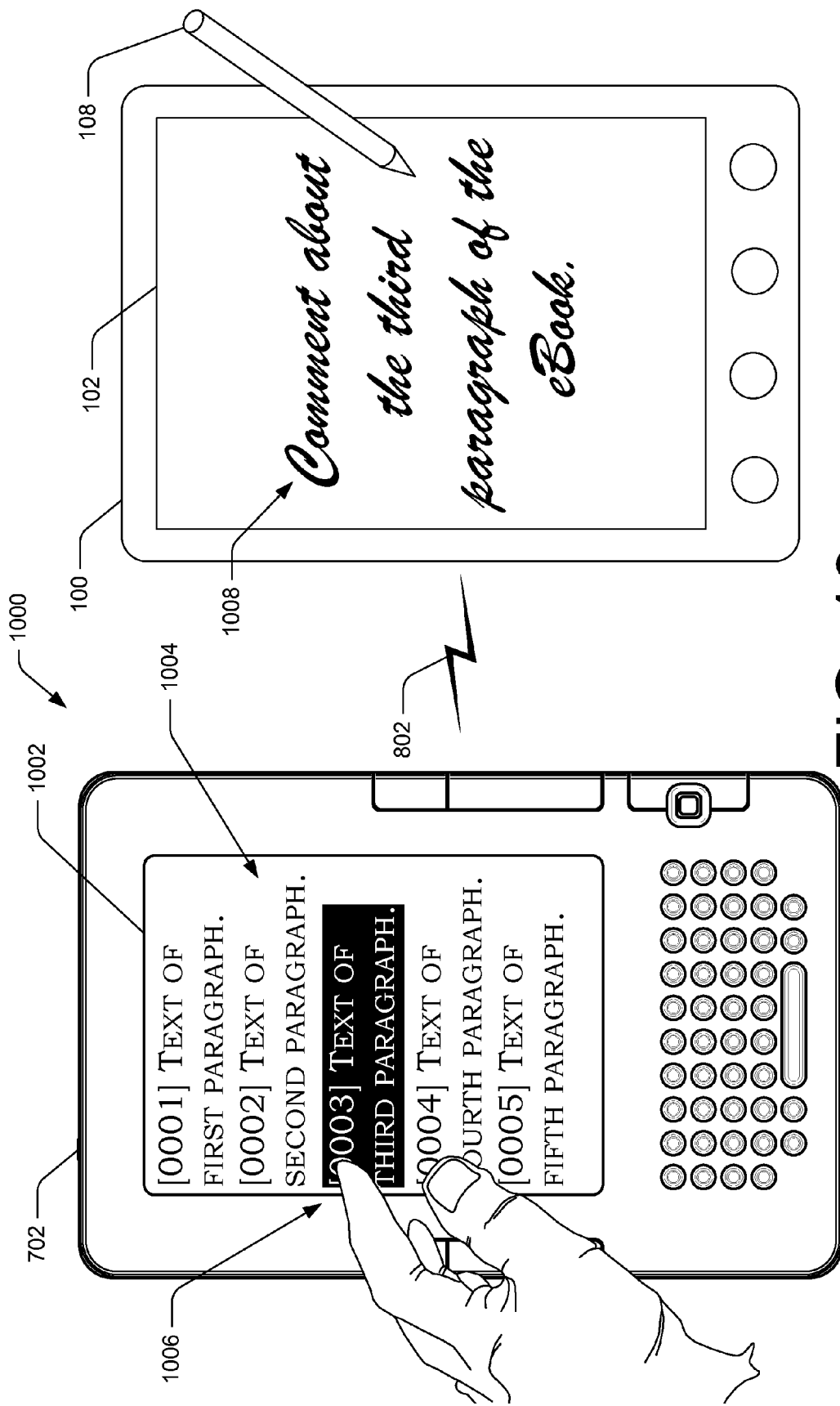
FIG. 10 shows the electronic device of FIG. 1 communicating with an eBook reader device to annotate a paragraph of an eBook.

FIG. 10 shows an architecture 1000 similar to the architecture 800 shown in FIG. 8. In the architecture 1000, the eBook reader device 702 has an active display 1002 that displays several paragraphs of text of a content item 1004. The paragraphs are shown as numbered in this illustration, but visible numbering is not required.

The user may select a one of the displayed paragraphs by using a cursor, a keypad, or, in implementations in which the active display 1002 is also a touch-screen display, by touching a paragraph with a finger or other object. The selected paragraph 1006 is paragraph 3 in this illustration. Depending on a configuration of the eBook reader device 702, the user may also select individual sentences, words, characters, or regions of whitespace.

Comments 1008 made about the selected paragraph 1006 (or other portion of the content item) on the marking surface 102 may be associated with the selected paragraph 1006 by any of the techniques discussed above. Thus, the portion of the content item 1004 with which the comments 1008 are associated may be a page or a smaller sub-portion such as a paragraph.

In some implementations, the act of selecting a portion (or sub-portion) of the content item 1004 may indicate that any comments made on the marking surface 102 are to be associated with the selected portion 1006 of the content item 1004. For example, the user may be able to touch a paragraph 1006 with his or her left hand, handwrite comments 1008 with his or her right hand, and those handwritten comments 1008 may be automatically associated with the selected paragraph 1006. A timestamp may be used to associate the comments 1008 with the selected paragraph 1006. For example, any marks made on the marking surface 102 during the time that a paragraph is selected (either by touch or otherwise) may be associated with that paragraph because of the temporal correspondence.

Figure 11:
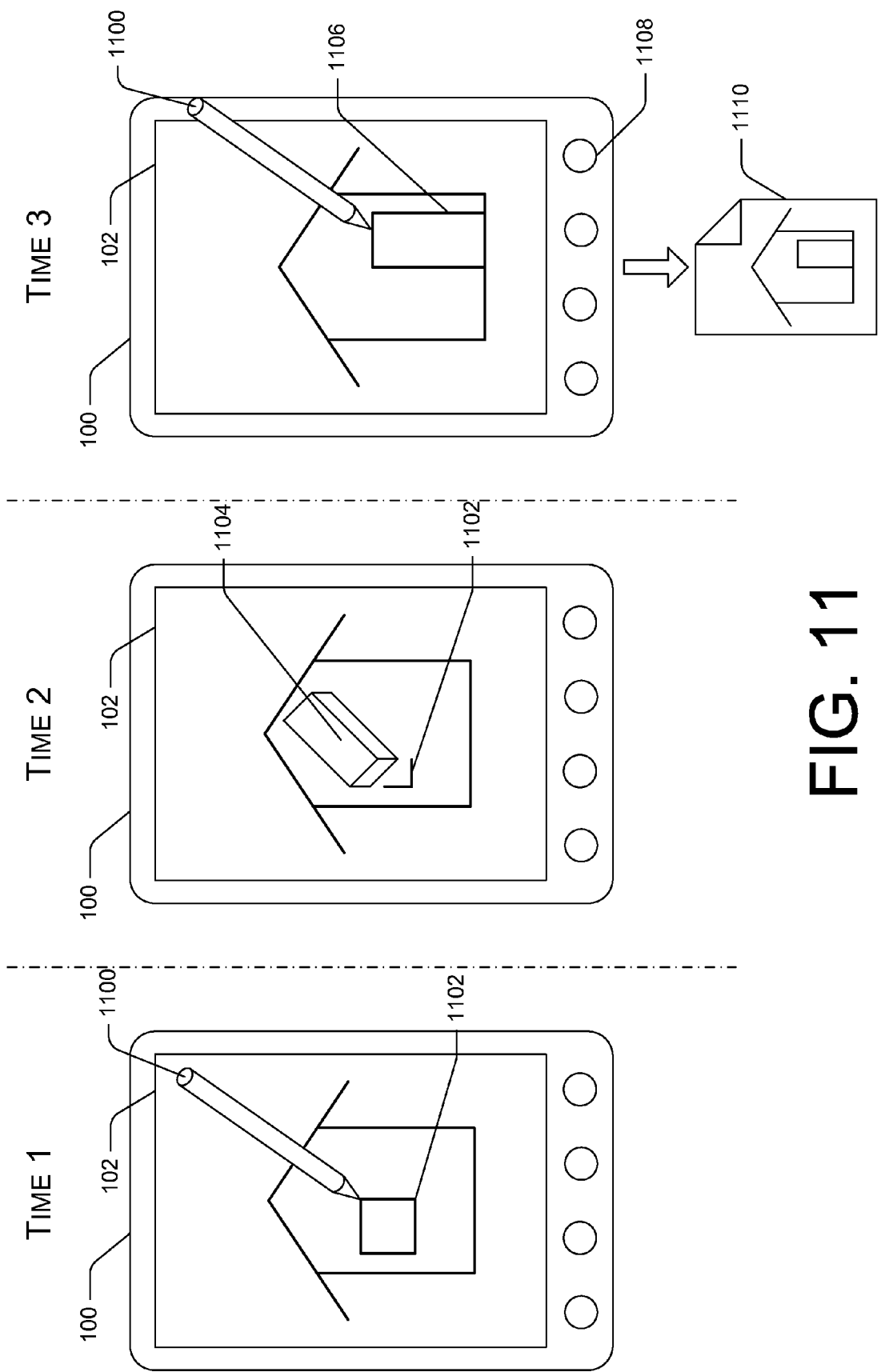
FIG. 11 shows drawings and erasures made on the electronic device of FIG. 1.

FIG. 11 shows a three time points of a user drawing, erasing, and redrawing a picture on the electronic device 100. At Time 1, the user draws a picture of a house on the marking surface 102 with a pen 1100 or other marking instrument. This version of the house includes a window 1102. The touch sensor 104 detects the contact of the pen 1100 with the marking surface 102 as shown in FIG. 1. Thus, an electronic image that is a copy of the marks drawn on the marking surface 102 with the pen 1100 may be created and stored in the electronic device 100.

At Time 2, the user decides to change the picture and erases the window 1102 with an eraser 1104. The touch sensor 104 (not shown) underneath the marking surface 102 may be able to distinguish between the pen 1100 and the eraser 1102 based on the shapes of the touch, the amount of instant force applied, and the distribution of instant force across the contact area with the marking surface 102 as transferred to the touch sensor 104. For example, the pen 1100 may have a small, hard tip and the eraser 1104 may have a larger, softer region of contact with the marking surface 102. Although the functions of the pen 1100 and the eraser 1104 (e.g., depositing ink and removing ink respectively) may not be detectable by the touch sensor 104, the differences in the type of contact made with the touch sensor 104 may be used to differentiate between marking touches and erasure touches. As an example, one type of touch sensor 104 capable of such differentiation is an IFSR touch sensor. By recognizing the touches of the eraser 1104 as erasure marks, the electronic device 100 may remove any lines or marks in the electronic image that correspond to the regions of the marking surface 102 erased by the eraser 1104. In contrast, failure to recognize the force applied by the eraser 1104 as erasure marks and instead treating the erasure marks as marks made by a large pen would create an electronic image that does not correspond to the marks visible to the user on the marking surface 102. Both addition of marks and erasure of marks on the marking surface 102 may be translated into appropriate changes to the electronic image created from applications of force detected by the touch sensor 104.

At Time 3, the user draws a door 1106 on the marking surface 102 of the electronic device 100. Detection and conversion of the markings that create the door 1106 to an electronic image may be the same as the processing of the markings that created the window 1102 at Time 1. The user may decide that he or she likes this version of the house with a door 1106 instead of the window 1102 and decided to save the image. The user may provide a save-image command to the electronic device 100 by, for example, pressing on a button 1108. Saving the electronic image as detected by the touch sensor 104 may copy the image from a temporary memory such as a cache to a separate file 1110. Although shown as a drawing of a house, similar techniques may also be used to interpret marks and erasures of text. For example, the user may handwrite a word then erase that word and replace it with a different word. For text, pressing the save button 1108 may also cause the OCR module 210 to convert the final text (i.e., accounting for all the erasures and provisions) into machine-encoded text.

Figure 12:
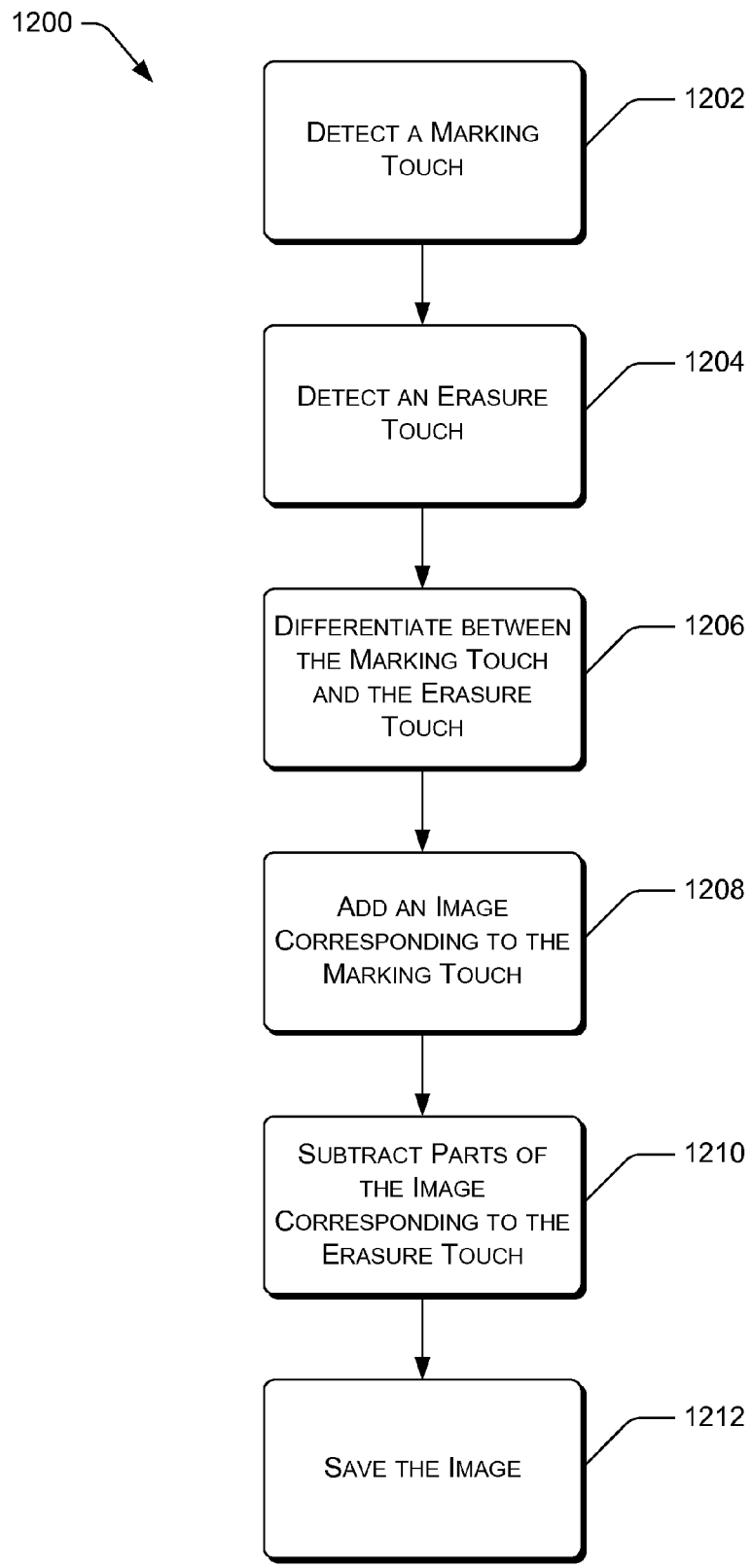
FIG. 12 is a flow diagram of a process for marking and erasing on the electronic device of FIG. 1 and saving the resulting image to a file.

FIG. 12 illustrates an example process 1200 that may be implemented by the electronic device 100 while receiving user input such as that shown in FIG. 11. Process 1200 may also be implemented while receiving other types of user input.

At 1202, a location and magnitude of force of a marking touch created by a marking instrument on a marking surface is detected by a force-sensitive touch sensor positioned under the marking surface. The force-sensitive touch sensor may be implemented as an IFSR touch sensor. The marking surface may be implemented as a pressure-sensitive cholesteric liquid crystal display.

At 1204, a location and magnitude of force of an erasure touch created by an eraser removing a marking from the marking surface is detected by the force sensitive touch sensor. The eraser may have different physical characteristics than the marking instrument. For example, a size or shape of the eraser may be different than that of the marking instrument. Also, the softness and the extent to which the eraser deforms under pressure may be different than that of the marking instrument.

At 1206, the marking touch and the erasure touch may be differentiated from one another based at least in part on a size of a contact area detected by the force-sensitive touch sensor and a distribution of the magnitude of force of the respective touches across the respective contact areas. This technique of differentiation based on a "touch signature" may also be used to differentiate between types of marking devices such as a pen and a brush.

At 1208, an image corresponding to the marking touch may be added to an electronic image file. For example, each line drawn on the marking surface is represented by a similar line in the electronic image file. While the marking surface shows what the user writes, the force-sensitive touch sensor digitizes or converts the pressure making those marks into an electronic signal. This electronic signal, not the actual marks (pen, pencil, whiteboard marker, etc.) is the basis for the electronic image file. Thus, the electronic image file is not the mark itself but is formed from a signal that corresponds to the mark.

At 1210, portions of the electronic image file are subtracted from regions that correspond to the location of the eraser touch. When the touch sensor determines that the eraser passed over a portion of the marking surface, a portion of the electronic image file that corresponds to the region of the marking surface touched (i.e., erased) by the eraser is removed from the image file.

At 1212, the electronic image file is saved to a memory such that the electronic image file is unaffected by further marking touches and/or erasure touches. For example, the image file may be in a state of constant revision while the user is drawing and erasing on the marking surface. However, when the user indicates that electronic image file is to be saved, for example by pressing a save-file button, the electronic image file may be converted to a read only file, it may be placed in a separate portion of the memory, and/or it may be assigned a new file name and stored in a separate memory such as, for example by being transmitted to a network storage device and stored in the "cloud."

The image may also be saved as a separate electronic image each time the touch sensor detects a marking touch or an erasure touch. This may create a history of the drawing and erasing actions so that the user may later review each stage of the drawing. In some implementations, the marking surface is not an active display, so the user would view the steps of drawing and erasing on another display such as the display of another computing device. Reviewing the separate drawing and erasing steps may presented like a movie in which the user can play, stop, fast forward, rewind, etc.

CONCLUSION

FIGS. 4 and 12 are illustrated as a collection of blocks in logical flow graphs, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the processes 400 and 1200 may be implemented on devices and architectures other than those shown above.

Although the subject matter has been described in language specific to structural features, it is to be understood that the subject matter defined in the appended claims is not necessarily limited to the specific features described. Rather, the specific features are disclosed as illustrative forms of implementing the claims

What is claimed is:

1. An electronic device comprising:
   one or more processors;
   a communications interface coupled to the one or more processors;
   a memory coupled to the one or more processors;
   a pressure-sensitive display configured to display one or more marks at a location on the display responsive to a marking instrument contacting the surface of the display;
   a force sensor located under the display, the force sensor configured to detect force transferred through the display by the marking instrument contacting the surface of the display when making the one or more marks; and
   a messaging module stored in the memory and configured to:
      interpret a first handwritten, non-text mark in association with a name of a recipient as a designation of a first electronic address for the recipient;
      interpret a second handwritten, non-text mark in association with the name of the recipient as a designation of a second electronic address for the recipient; and
      send a representation of the one or more marks as detected by the touch sensor to the first electronic address, the second electronic address, or both via the communications interface.

2. The device of claim 1, wherein the electronic device comprises at least one of a dedicated electronic book reader device, a mobile phone, a tablet computer, a whiteboard, or a computer peripheral.

3. The device of claim 1, further comprising a power source to provide power to the display and the touch sensor.

4. The device of claim 3, wherein the power source comprises at least one of a battery or a connection to an external power source.

5. The device of claim 1, wherein the communications interface comprises at least one of an antenna or a wired communications connection.

6. The device of claim 1, wherein the memory further comprises an optical character recognition module configured to convert handwritten text written on the surface of the display and detected by the touch sensor into machine-encoded text.

7. The device of claim 1, wherein the memory further comprises an image recording module configured to store, in at least one of the memory or a remote storage device, the one or more marks detected by the touch sensor as an electronic image.

8. The device of claim 1, further comprising an annotation module stored in the memory and configured to cause the one or more marks generated on the surface of the display and detected by the force sensor to be stored as having an association with a portion of a content item that is contemporaneously displayed on the display while the one or more marks are generated.

9. The device of claim 1, wherein the first electronic address comprises an email address and the second electronic address comprises a text message address.

10. The device of claim 1, wherein the pressure-sensitive display comprises a liquid-crystal display.

11. The device of claim 1, wherein the force sensor comprises an interpolating force-sensitive resistance touch sensor.

12. An electronic device comprising:
one or more processors;
a memory coupled to the one or more processors;
an active display configured to generate an image in a display region responsive to instructions from the one or more processors;
a marking surface comprising a marking region;
a cover, wherein the marking surface is located on a first inside panel of the cover and the active display is located on a second inside panel of the cover;
a touch sensor located under the marking surface, the touch sensor configured to detect force transferred through the marking region of the marking surface by a marking instrument generating a mark on the marking surface; and
an annotation module stored in the memory and configured to store the mark generated on the marking surface and detected by the touch sensor as having an association with a portion of a content item that is contemporaneously displayed on the active display while the mark is generated, wherein the annotation module is further configured to create the association between the mark and the portion of the content item in response to actuation of a user input device on the device.

13. The device of claim 12, wherein the active display comprises a touch-screen display and the annotation module is further configured to store the mark generated on the marking surface in association with a sub-portion of the portion of the content item contemporaneously displayed on the active display, the sub-portion indicated at least in part by a location of a touch on the active display.

14. The device of claim 12, wherein the annotation module is further configured to display the mark on the active display or display a link that causes the mark to be displayed on the active display when the portion of the content item is subsequently displayed on the active display.

15. The device of claim 12, wherein the content item comprises a plurality of webpages and the portion of the content item comprises a one of the plurality of webpages.

16. The device of claim 12, wherein the electronic device comprises a dedicated electronic book reader.

17. The device of claim 16, wherein the content item comprises an electronic book and the portion of the content item comprises a page of the electronic book.

18. The device of claim 12, wherein the active display comprises an electrophoretic display.

19. The device of claim 12, wherein the marking surface comprises a display configured to display a mark at a location on the display responsive to the marking instrument contacting the marking surface at the location.

20. The device of claim 12, wherein the touch sensor comprises an interpolating force-sensitive resistance touch sensor.

21. The device of claim 12, wherein the mark and the content item are stored in the memory.

22. The device of claim 12, further comprising a module stored in the memory and configured to display the mark together with the portion of the content item when the portion of the content item is rendered on the active display.

23. The device of claim 12, wherein the cover comprises a connection mechanism for physically affixing the cover to the device.

24. The device of claim 23, wherein the connection mechanism transfers data between the cover and at least one other portion of the device.

25. The device of claim 12, wherein the cover is detachable.

26. A computer-implemented method under control of one or more computer systems configured with executable instructions comprising:
detecting, by a force-sensitive touch sensor positioned under a marking surface, a location and magnitude of force of a marking touch created by a marking instrument while making a mark on the marking surface;
detecting, by the force-sensitive touch sensor, a location and magnitude of force of an erasure touch created by an eraser removing a mark from the marking surface; and
differentiating between the marking touch and the erasure touch based at least in part on a size of a contact area detected by the force-sensitive touch sensor and a distribution of amounts of force applied across multiple locations of the contact area.

27. The method of claim 26, wherein the force-sensitive touch sensor comprises an interpolating force-sensitive resistance touch sensor.

28. The method of claim 26, wherein the marking surface comprises a pressure-sensitive cholesteric liquid crystal display.

29. The method of claim 26, further comprising:
responsive to detecting the marking touch, adding an image corresponding to the marking touch to an electronic image file; and
responsive to detecting the erasure touch, subtracting portions of the electronic image file at regions corresponding to the location of the erasure touch.

30. The method of claim 26, further comprising saving the electronic image file to a memory such that the electronic image is unaffected by further marking touches and/or erasure touches.

31. The method of claim 30, further comprising saving a separate electronic image each time a marking touch or an erasure touch is detected.

32. The method of claim 26, wherein the marking surface comprises paper.

33. A method comprising:
assembling an electronic device having a touch sensor under one or more sheets of paper; and
causing the touch sensor to generate an electronic image corresponding to marks made on the one or more sheets of paper with a marking instrument, wherein the touch sensor generates the electronic image based at least in part upon a location of touch transferred through the one or more sheets of paper to the touch sensor; and
causing the electronic device to save the electronic image in response to detecting an opening of a clip holding the one or more sheets of paper against the touch sensor.

34. The method of claim 33, wherein the touch sensor comprises an interpolating force-sensitive resistance touch sensor.

35. The method of claim 34, wherein the electronic image is based at least in part upon an amount of incident force applied while making the marks.

36. The method of claim 33, wherein the electronic device has a whiteboard coating covering the touch sensor, the whiteboard coating suitable for writing on with a whiteboard marker in the absence of the one or more sheets of paper.

* * * * *